(12) United States Patent
Anspaugh et al.

(10) Patent No.: US 11,623,678 B2
(45) Date of Patent: Apr. 11, 2023

(54) DUAL DIRECTION LOCKING MECHANISM FOR TELESCOPING STEERING COLUMN

(71) Applicant: Steering Solutions IP Holding Corporation, Saginaw, MI (US)

(72) Inventors: Michael P. Anspaugh, Bay City, MI (US); Donald A. Buzzard, Saginaw, MI (US); Michael W. Clark, Essexville, MI (US); Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/471,476

(22) Filed: Sep. 10, 2021

(65) Prior Publication Data

US 2021/0403074 A1 Dec. 30, 2021

Related U.S. Application Data

(62) Division of application No. 16/669,293, filed on Oct. 30, 2019, now abandoned, which is a division of application No. 15/711,217, filed on Sep. 21, 2017, now Pat. No. 10,494,011.

(60) Provisional application No. 62/397,637, filed on Sep. 21, 2016.

(51) Int. Cl.
*B62D 1/184* (2006.01)
*B62D 1/185* (2006.01)
*B62D 1/19* (2006.01)

(52) U.S. Cl.
CPC .............. *B62D 1/184* (2013.01); *B62D 1/185* (2013.01); *B62D 1/192* (2013.01)

(58) Field of Classification Search
CPC ........ B62D 1/184; B62D 1/185; B62D 1/192; B62D 1/19; B62D 1/195; B62D 1/187; B62D 1/189; B62D 1/18; F16F 7/128
USPC .................................... 280/775, 777; 74/493
See application file for complete search history.

(56) References Cited

U.S. PATENT DOCUMENTS

| 5,820,163 | A | * | 10/1998 | Thacker | B62D 1/184 |
| | | | | | 280/775 |
| 2006/0082119 | A1 | * | 4/2006 | Tinnin | B62D 1/184 |
| | | | | | 280/775 |
| 2010/0300238 | A1 | * | 12/2010 | Ridgway | B62D 1/184 |
| | | | | | 74/493 |
| 2012/0125139 | A1 | * | 5/2012 | Tinnin | B62D 1/184 |
| | | | | | 74/493 |
| 2013/0205935 | A1 | * | 8/2013 | Buzzard | B62D 1/184 |
| | | | | | 74/495 |
| 2014/0251059 | A1 | * | 9/2014 | Russell | B62D 1/195 |
| | | | | | 74/492 |

(Continued)

*Primary Examiner* — Keith J Frisby
(74) *Attorney, Agent, or Firm* — Dickinson Wright PLLC

(57) ABSTRACT

A locking mechanism for a telescoping steering column includes an energy absorption strap having a plurality of teeth disposed therealong. Also included is a clamp bolt rotatably driven by an adjustment lever. Further included is an actuator body coupled to the clamp bolt and rotated therewith. Yet further included is a first lock cam coupled to the actuator body and engageable with the teeth of the energy absorption strap to lock the telescoping steering column in a first direction. Also included is a second lock cam coupled to the actuator body and engageable with the teeth of the energy absorption strap to lock the telescoping steering column in a second direction different than the first direction.

7 Claims, 9 Drawing Sheets

(56) References Cited

U.S. PATENT DOCUMENTS

2015/0128752 A1\* 5/2015 Buzzard ................ F16F 7/128
74/493

\* cited by examiner

DUAL DIRECTION LOCKING MECHANISM FOR TELESCOPING STEERING COLUMN

CROSS REFERENCE TO RELATED APPLICATIONS

This patent application is a divisional application of U.S. patent application Ser. No. 16/669,293, filed Oct. 30, 2019, which is a divisional application of U.S. patent application Ser. No. 15/711,217, filed Sep. 21, 2017, which claims the benefit of priority to U.S. Provisional Patent Application Ser. No. 62/397,637, filed Sep. 21, 2016, the disclosures of which are incorporated by reference herein in their entireties.

BACKGROUND

The invention relates to vehicle steering columns and, more particularly, to a dual direction locking mechanism for telescoping steering columns.

Steering column assemblies often include multiple portions that are telescopingly adjustable relative to each other. This is desirable for individual driver comfort and preference. Additionally, the telescoping relationship facilitates a collapsible steering column that may provide safety advantages during an energy absorption event.

A locking mechanism is required to maintain the moveable portion of the steering column at the desired position after telescoping adjustment. Some column assemblies provide what may be referred to as "infinite positioning" with a single direction locking capability. Mechanisms that lock in the forward direction, for example, typically are limited to using clamp friction to resist steering column movement in the rearward direction. Assemblies that do not allow infinite positioning in a telescoping direction often require the driver to readjust the steering column and repeat the clamp lever locking cycle to eliminate a tooth on tooth engagement condition.

SUMMARY OF THE DISCLOSURE

In one aspect of the invention, a locking mechanism for a telescoping steering column includes an energy absorption strap having a plurality of teeth disposed therealong. Also included is a clamp bolt rotatably driven by an adjustment lever. Further included is an actuator body coupled to the clamp bolt and rotated therewith. Yet further included is a first lock cam coupled to the actuator body and engageable with the teeth of the energy absorption strap to lock the telescoping steering column in a first direction. Also included is a second lock cam coupled to the actuator body and engageable with the teeth of the energy absorption strap to lock the telescoping steering column in a second direction different than the first direction.

In another aspect of the invention, a locking mechanism for a telescoping steering column includes an energy absorption strap having a plurality of teeth disposed therealong. Also included is a first lock cam engageable with the teeth of the energy absorption strap to lock the telescoping steering column in a first direction. Further included is a second lock cam engageable with the teeth of the energy absorption strap to lock the telescoping steering column in a second direction. Yet further included is a spring biasing the lock cams into engagement with the teeth of the energy absorption strap into a locked condition. Also included is an adjustment lever having a cam profile engageable with at least one of the lock cams upon rotation of the adjustment lever to overcome the spring bias of the lock cams to disengage the lock cams from the energy absorption strap into an unlocked condition.

In yet another aspect of the invention, a steering column assembly includes a lower jacket and an upper jacket in telescoping engagement with the lower jacket. Also included is an energy absorption strap operatively coupled to the lower jacket and the upper jacket, the energy absorption strap having a plurality of teeth disposed therealong. Further included is a first lock cam engageable with the teeth of the energy absorption strap to lock the upper jacket in a first direction. Yet further included is a second lock cam engageable with teeth associated with the upper jacket to lock the upper jacket in a second direction opposite to the first direction. Also included is a clamp lever that is rotatable by an operator, rotation of the clamp lever moving the first lock cam and the second lock cam from a locked condition to an unlocked condition, the locked condition being engagement between at least one tooth of the first lock cam with the teeth of the energy absorption strap and at least one tooth of the second lock cam with the teeth associated with the upper jacket, the unlocked condition being disengagement between the first and second lock cams with the respective teeth.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a telescope locking mechanism for a steering column is provided to allow "infinite positioning" while also positively locking the steering column in a forward and rearward direction, as will be appreciated from the disclosure herein.

Figure 1:
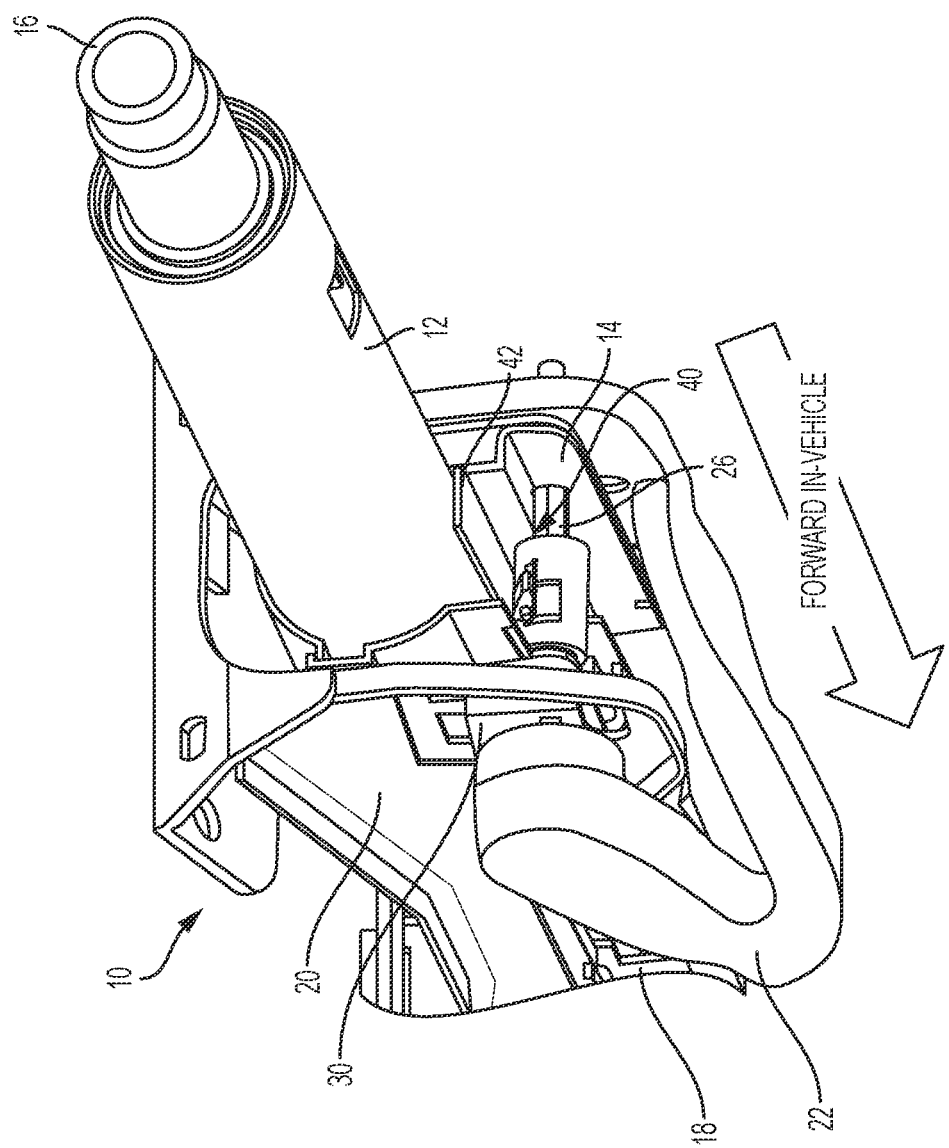
FIG. 1 is a perspective view of a steering column assembly with a locking mechanism in a locked condition according to an aspect of the invention.
Figure 2:
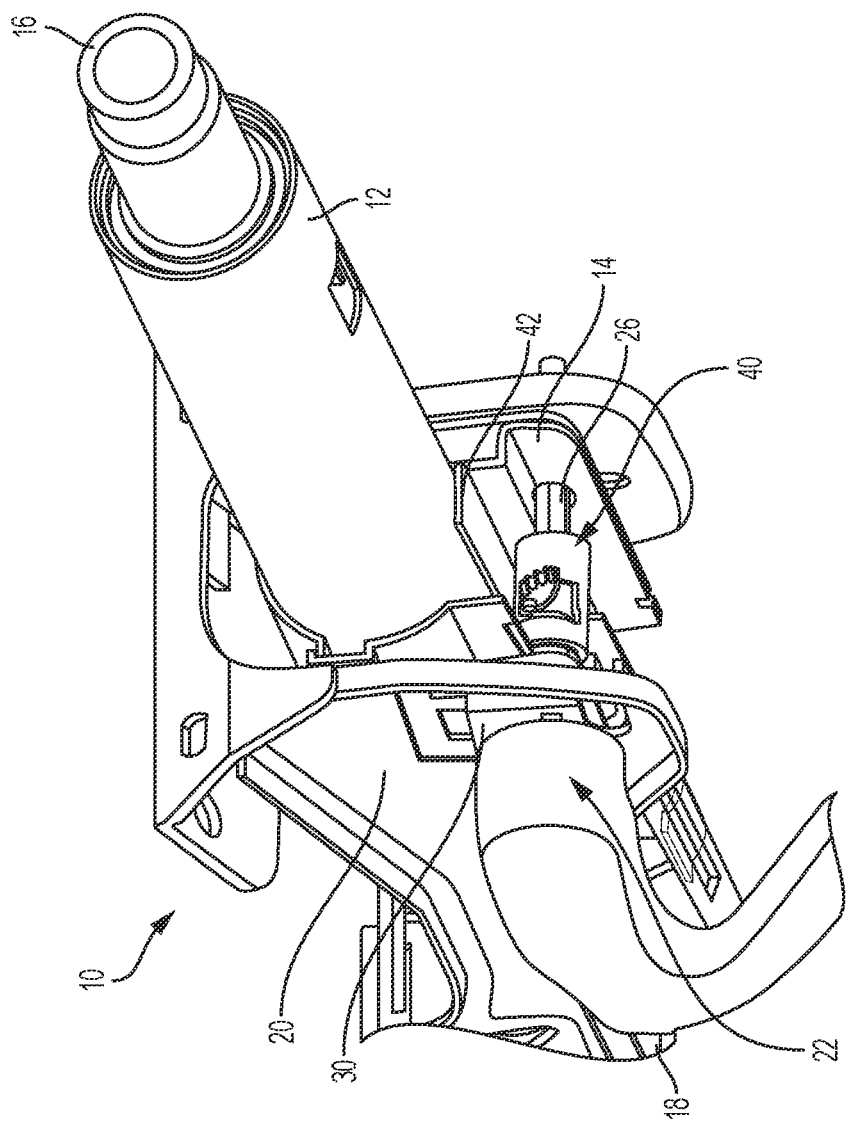
FIG. 2 is a perspective view of the steering column assembly of FIG. 1 with the locking mechanism in an unlocked condition.

Referring now to FIGS. 1 and 2, a portion of a steering column is illustrated and generally referenced with numeral 10. The steering column 10 includes several components, including an upper jacket 12 and a lower jacket 14 that are telescopingly engaged with each other in an axial direction (i.e., longitudinal direction of steering column). A first side 16 of the portion of the steering column 10 is closer to the driver, where a steering wheel would be positioned. A second side 18 of the portion of the steering column 10 is closer to a steering gear.

The steering column 10 may be used in any type of vehicle that requires steering operation, including autonomous or semi-autonomous vehicles equipped with an advanced driver assist system. A mounting bracket 20 is operatively coupled to the steering column to allow adjustment or relative motion of components of the steering column 10. Adjustment is facilitated by manipulation of an adjustment lever 22 (may also be referred to herein as a clamp lever) that is operatively coupled to the lower jacket 14. In particular, the adjustment lever 22 is coupled to a clamp bolt 26 that extends in a transverse direction through apertures of the lower jacket 12 and through bracket apertures of the mounting bracket 20. Spaced outwardly of the mounting bracket 20 are one or more components on each side of the mounting bracket 20. For example, a spacer 30 may be disposed on each side of the mounting bracket 20.

Figure 10:
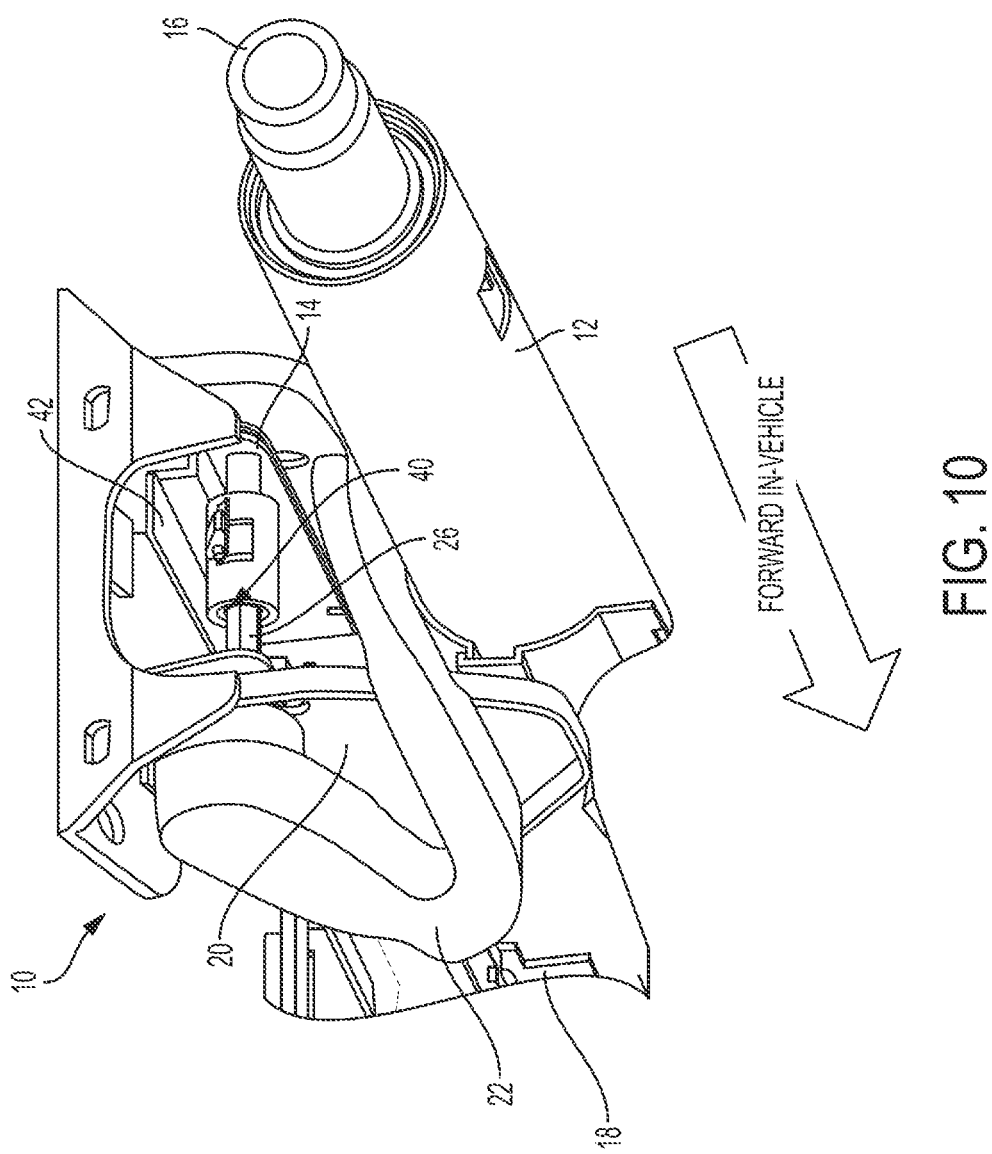
FIG. 10 is a perspective view of a steering column assembly with the locking mechanism and the energy absorption strap on a top side of the steering column assembly.

Actuation of the adjustment lever 22 allows a user to switch the steering column between a locked condition (FIG. 1) and an unlocked condition (FIG. 2). In the unlocked condition, a user is able to telescopiningly adjust the upper jacket 12 relative to the lower jacket 14 to suit the user's preference. In the locked condition, relative movement of components of the steering column 10 is inhibited. As disclosed herein, the adjustment lever 22 works in conjunction with a locking mechanism 40 that locks telescope travel in both the forward and rearward directions (or axially opposite directions) relative to an energy absorption strap 42 that is operatively coupled to the upper and lower jackets 12, 14. The energy absorption strap 42 absorbs energy during a collapse event of the steering column 10. In the illustrated embodiment, the energy absorption strap 42 is positioned on a bottom portion of the steering column 10, in what may be referred to as a 6 o'clock position. It is to be appreciated that the energy absorption strap 42 may be positioned on an upper portion of the steering column 10, in what may be referred to as a 12 o'clock position, as shown in FIG. 10.

Figure 3:
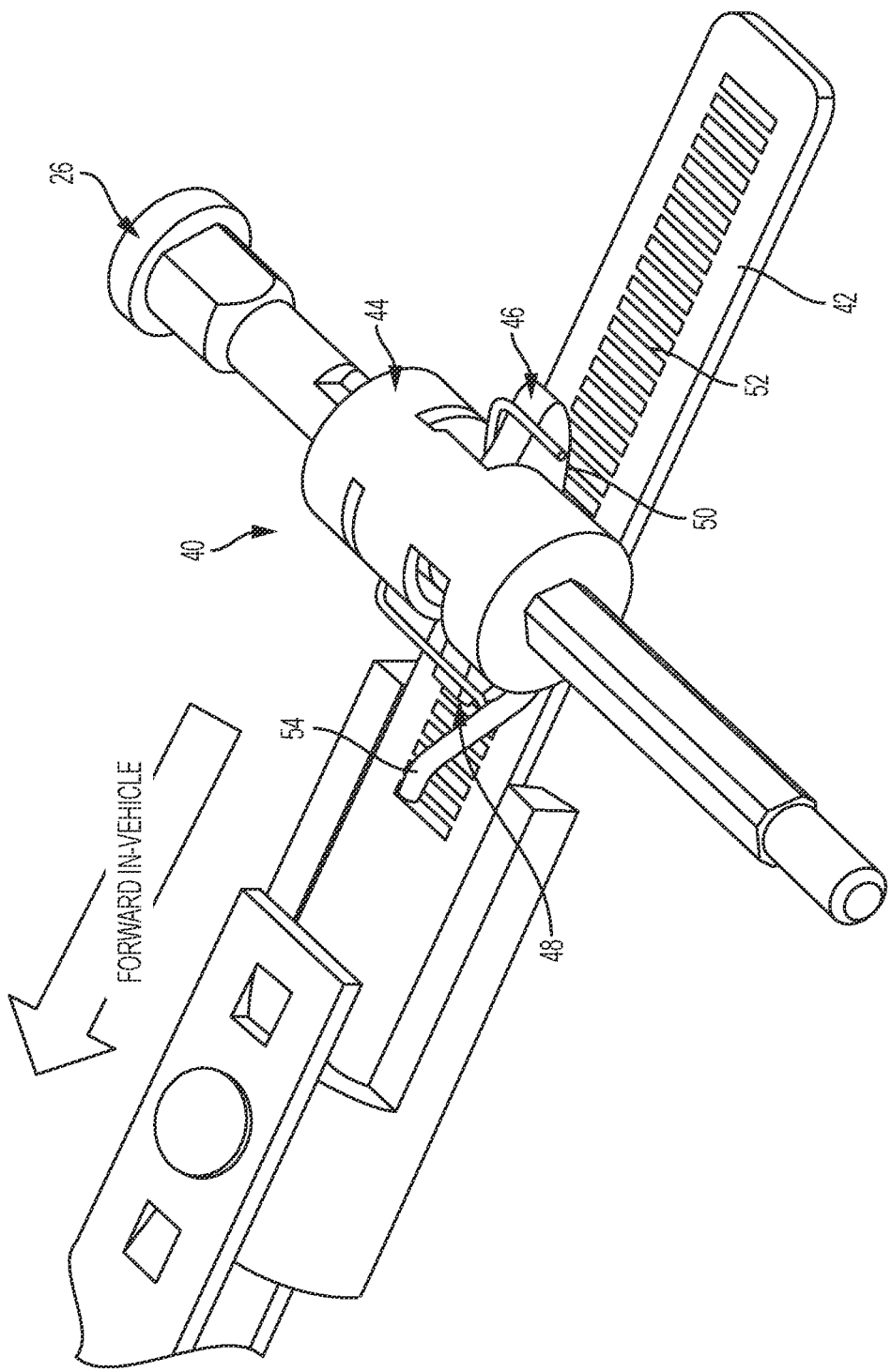
FIG. 3 is a perspective view of the locking mechanism of FIG. 1.
Figure 5:
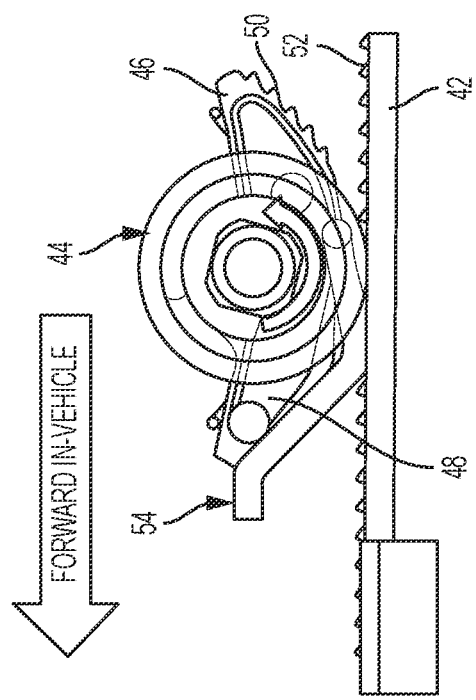
FIG. 5 is an elevational view of the locking mechanism of FIG. 1 in the unlocked condition.
Figure 4:
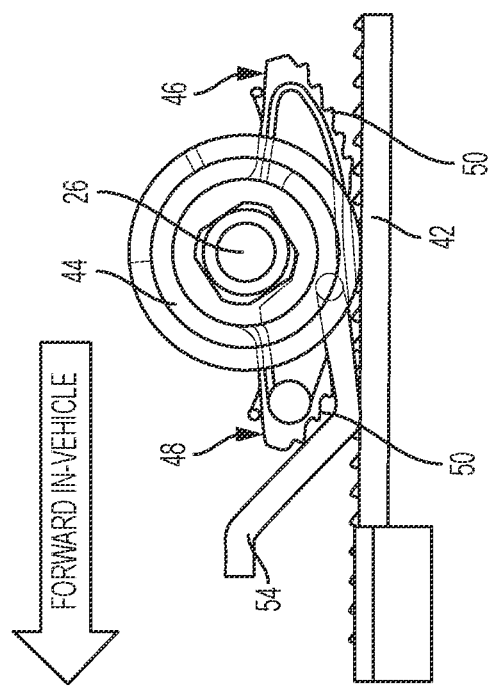
FIG. 4 is an elevational view of the locking mechanism of FIG. 1 in the locked condition.
Figure 6:
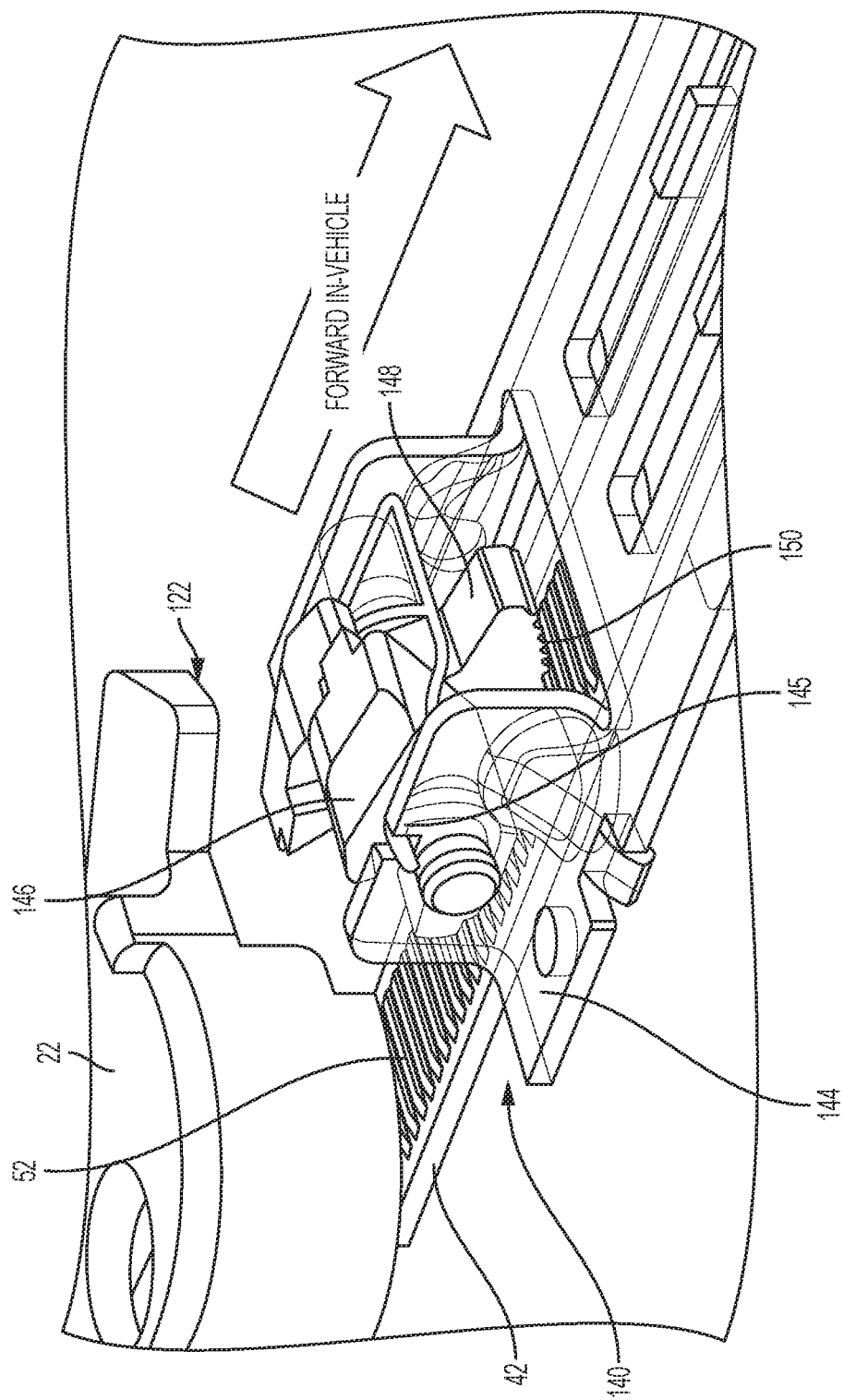
FIG. 6 is a perspective view of a locking mechanism in a locked condition according to another aspect of the invention.
Figure 7:
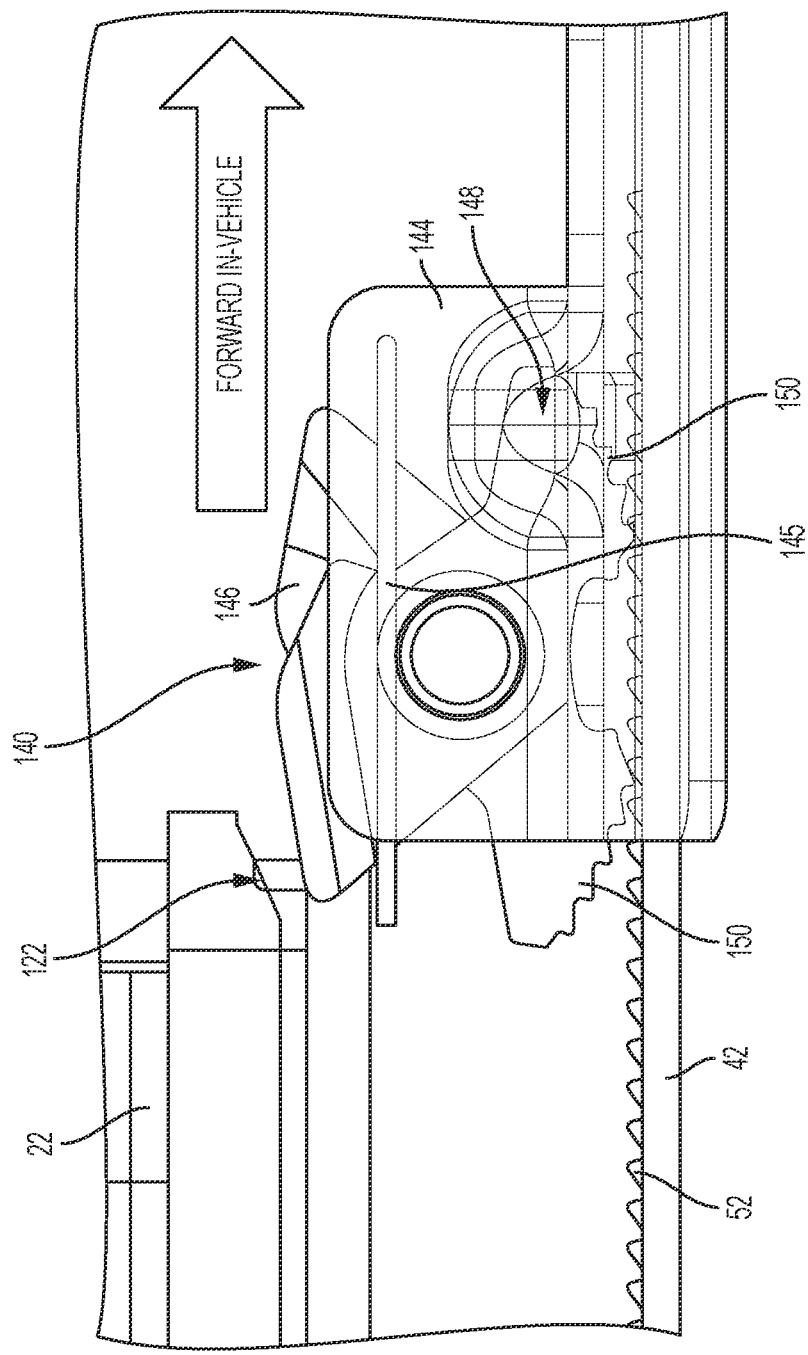
FIG. 7 is an elevational view of the locking mechanism of FIG. 6 in the locked condition.

Referring now to FIGS. 3-5, the locking mechanism 40 is illustrated in greater detail. The locking mechanism 40 includes an actuator body 44 that is coupled to the clamp bolt 26 in a manner that facilitates simultaneous and corresponding rotation by the actuator body 44 and the clamp bolt 26. The clamp bolt 26 is driven in a rotatable manner by the adjustment lever 22. Operatively coupled to the actuator body 44 are two lock cams. Specifically, a first lock cam 46 locks the telescoping motion of the steering column 10 from moving in a forward direction and a second lock cam 48 locks the telescoping motion of the steering column 10 from moving in a rearward direction. Each lock cam 46, 48 includes a plurality of teeth 50. At least one of each plurality of teeth is engageable with teeth 52 located along a surface of the energy absorption strap 42 in a locked condition (FIG. 4) and disengaged to establish the unlocked condition (FIG. 5).

The lock cams 46, 48 are spring loaded into engagement with the teeth 52 of the energy absorption strap 42 (i.e., locked condition). To overcome the spring bias, the actuator body 44 is rotated upon rotation of the clamp bolt 26 by the adjustment lever 22. Rotation of the actuator body 44 directly, or indirectly through a lift linkage 54, overcomes the spring load and rotates the lock cams 46, 48 to the unlocked condition. In some embodiments, both lock cams 46, 48 are rotated to the unlocked condition directly by the actuator body 44. In other embodiments, the lift linkage 54 rotates both cam locks 46, 48. In the illustrated embodiment, the lift linkage 54 disengages the second lock cam 48 and the actuator body 44 directly disengages the first lock cam 46.

Referring now to FIGS. 6-9, another embodiment of the locking mechanism is illustrated and is referenced generally with numeral 140. In the illustrated embodiment, the energy absorption strap 42 is positioned on a side portion of the steering column 10, in what may be referred to as a 3 o'clock position or a 9 o'clock position. A mounting structure 144 is mounted to the steering column 10 with a spring member 145 mounted thereto.

Figure 8:
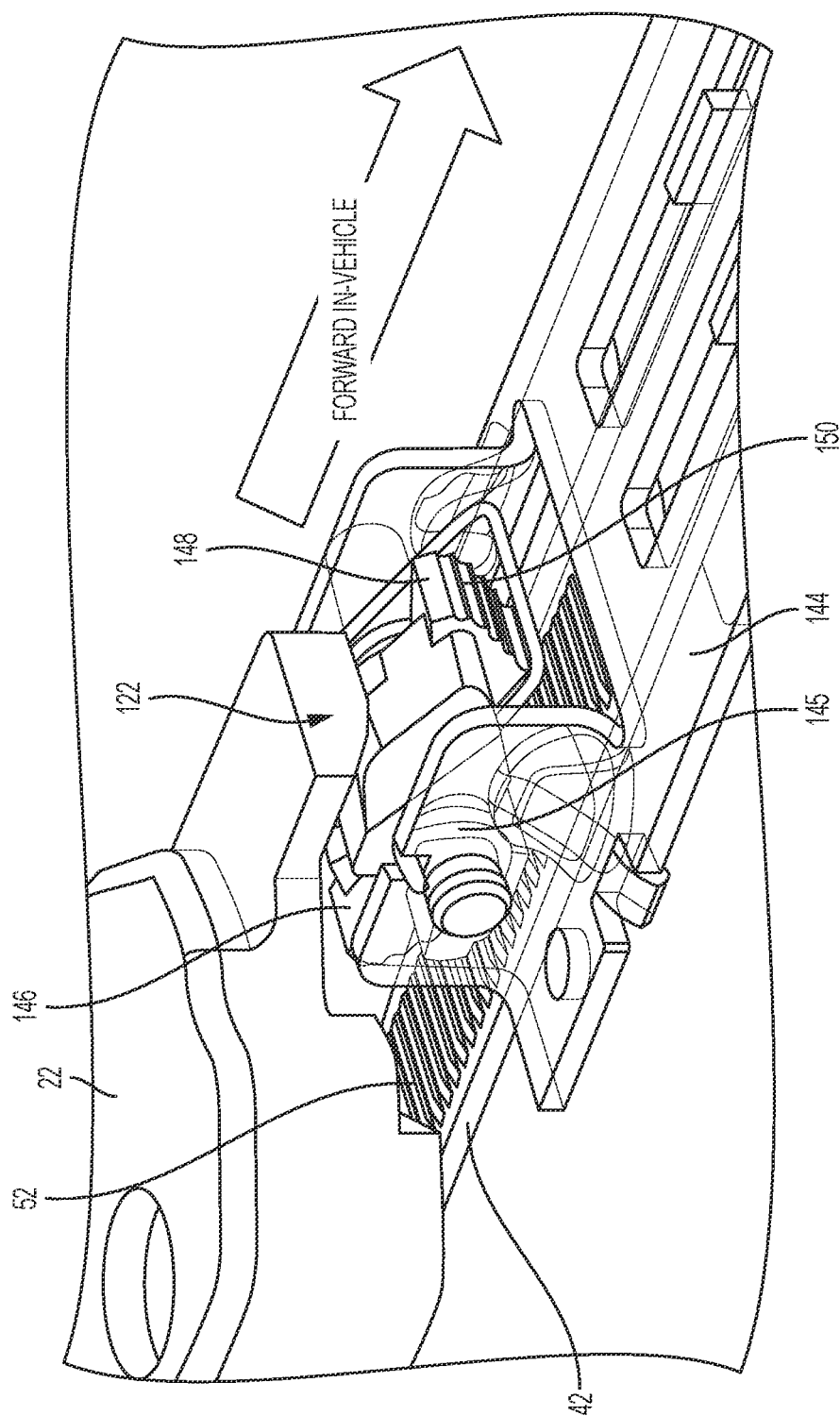
FIG. 8 is a perspective view of the locking mechanism of FIG. 6 in an unlocked condition.
Figure 9:
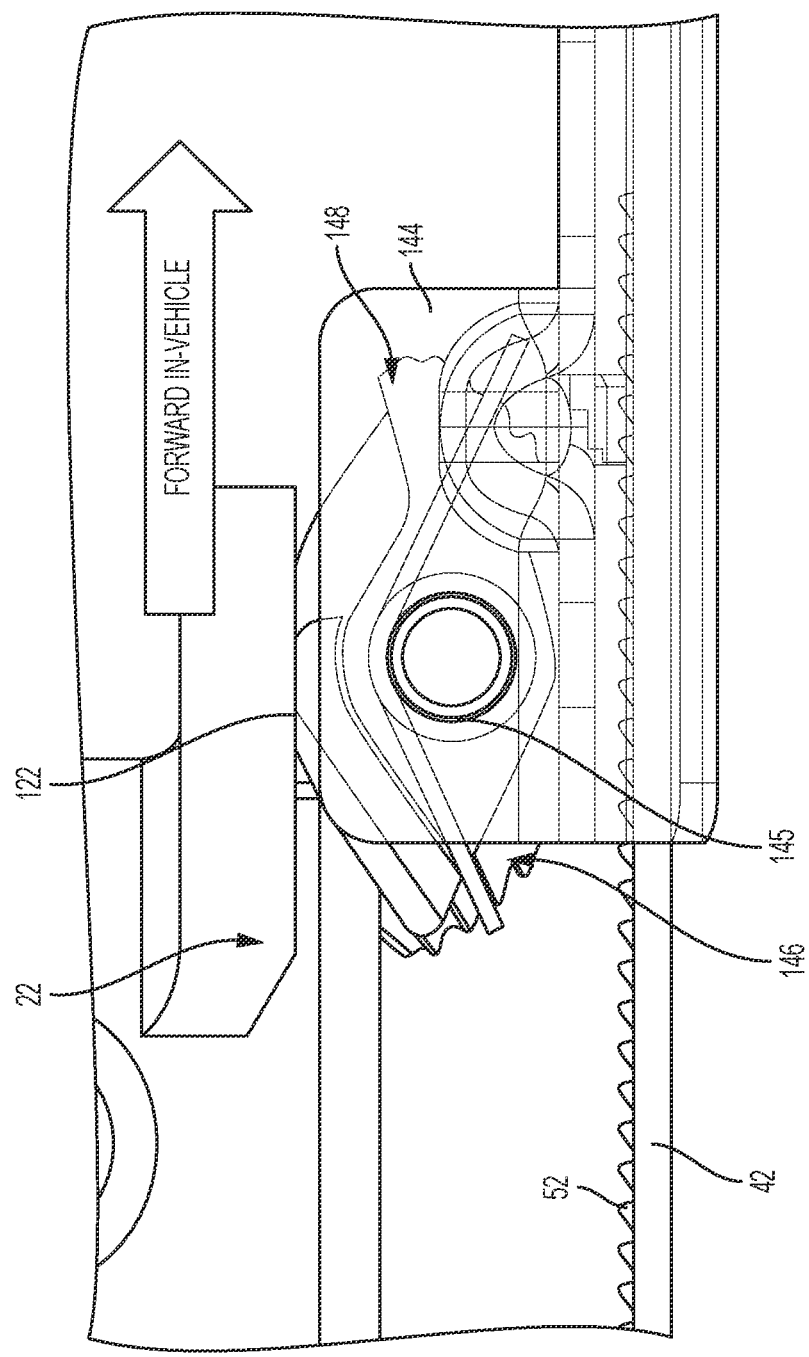
FIG. 9 is an elevational view of the locking mechanism of FIG. 6 in the unlocked condition.

Operatively coupled to the spring member 145 are two lock cams. Specifically, a first lock cam 146 locks the telescoping motion of the steering column 10 from moving in a forward direction and a second lock cam 148 locks the telescoping motion of the steering column 10 from moving in a rearward direction. Each lock cam 146, 148 includes a plurality of teeth 150. At least one of each plurality of teeth 150 is engageable with the teeth 52 of the energy absorption strap 42 in a locked condition (FIGS. 6 and 7) and disengaged to establish the unlocked condition (FIGS. 8 and 9).

The lock cams 146, 148 are spring loaded into engagement with the teeth 52 of the energy absorption strap 42 (i.e., locked condition) with the spring member 145. To overcome the spring bias, the adjustment lever 22 is rotated to engage at least one of the lock cams 146, 148. In particular, the adjustment lever 22 includes a cam profile 122 along a portion that engages at least one of the lock cams 146, 148 to bias the lock cams 146, 148 out of engagement with the energy absorption strap 42. In some embodiments, the cam profile 122 only engages one of the lock cams, where rotation of one lock cam results in rotation of the other lock cam. In other embodiments, the cam profile 122 engages both lock cams.

As the lock cams 146, 148 are disengaged from the energy absorption strap 42, the locking mechanism 140, and therefore the telescoping steering column 10, is transitioned to the unlocked position for adjustment thereof.

In some embodiments, the second lock cam, 48 or 148, is configured to lock directly to at least one of a plurality of teeth that are formed as part of the upper jacket 12. As an alternative to direct tooth engagement with the upper jacket 12, the second lock cam, 48 or 148, is configured to lock indirectly to the upper jacket 12 via one or more intermediate components that is/are rigidly affixed to the upper jacket 12. In such embodiments, engaging the second lock cam 48, 148 to the upper jacket 12 provides highly rigid rearward retention and/or allows a much lower energy absorption strap load for forward direction collapse. For this option, the teeth that are on the energy absorption strap 42 would be narrower, relative to the embodiments described above, and only reside under the first lock cam, 46 or 146.

Rather than relying on rearward motion resistance with clamp friction provided by tension created in the clamp bolt when the clamp lever is rotated to a locked position, the second cam lock 48, 148 disclosed herein enhances the rearward retention beyond the capacity generated by the clamp pressure generated by the clamp bolt. It also may be beneficial to create rearward retention load while allowing lower clamp bolt tension which directly reduces the force required by the driver to lock the clamp lever. The enhanced retention is established by the dual direction locking provided by the cam locks, while allowing infinite positioning by a driver.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A locking mechanism for a telescoping steering column comprising:
    an energy absorption strap having a plurality of teeth disposed therealong;
    a clamp bolt rotatably driven by an adjustment lever;
    an actuator body coupled to the clamp bolt and rotated therewith;
    a first lock cam coupled to the actuator body and engageable with the teeth of the energy absorption strap to lock the telescoping steering column in a first direction; and
    a second lock cam coupled to the actuator body and engageable with the teeth of the energy absorption strap to lock the telescoping steering column in a second direction different than the first direction,
    wherein the energy absorption strap is located on a top side of the telescoping steering column.

2. The locking mechanism of claim 1, wherein the first lock cam and the second lock cam are biased into engagement with the teeth of the energy absorption strap to provide a locked condition.

3. The locking mechanism of claim 2, wherein the lock cams are biased with a spring.

4. The locking mechanism of claim 2, wherein rotation of the actuator body overcomes the bias of the lock cams to disengage the lock cams from the teeth of the energy absorption strap.

5. The locking mechanism of claim 4, wherein rotation of the actuator body directly rotates at least one of the lock cams.

6. The locking mechanism of claim 4, further comprising a lift linkage operatively coupled to the actuator body and at least one of the lock cams, the lift linkage overcoming the bias of the at least one lock cam.

7. The locking mechanism of claim 1, wherein the second direction is axially opposite the first direction.

\* \* \* \* \*